United States Patent [19]
Wilson

[11] Patent Number: 6,031,471
[45] Date of Patent: Feb. 29, 2000

[54] FULL ALPHANUMERIC CHARACTER SET ENTRY FROM A VERY LIMITED NUMBER OF KEY BUTTONS

[75] Inventor: Mark E Wilson, Christchurch, New Zealand

[73] Assignee: Trimble Navigation Limited

[21] Appl. No.: 09/020,624

[22] Filed: Feb. 9, 1998

[51] Int. Cl.[7] .............................. H03K 17/94; G09G 5/00
[52] U.S. Cl. ............................... 341/22; 341/28; 700/84; 345/156; 345/168
[58] Field of Search ................... 341/22, 28; 700/17, 700/83, 84; 345/156, 168; 379/52, 354

[56] References Cited

U.S. PATENT DOCUMENTS

| | | | |
|---|---|---|---|
| 4,742,473 | 5/1988 | Shugar et al. | 345/156 |
| 5,581,593 | 12/1996 | Engelke et al. | 379/52 |

*Primary Examiner*—Donnie L. Crosland
*Attorney, Agent, or Firm*—Thomas E. Schatzel; Thomas E. Schatzel A Prof. Corp.

[57] ABSTRACT

A graphical machine-user interface includes a processor connected to a display screen to generate a screen display of individual items in groups together with the selector indication. The processor and a display screen are used to advantage to provide a rich keyboard function from a very limited set of pushbuttons. For example, five pushbuttons indicating "up", "right", "down", "left", and "middle" are recursively used to reduce a large two-dimensional matrix of item choices presented on the display to some subset, e.g., a top, right, bottom, left, or middle subset. If the reduction results in a choice of one, then that item is selected and output automatically. If the reduction results in a subset with more than one item, then a recursive process is used in which the selection process is repeated until the selected subset is reduced to a single item.

12 Claims, 5 Drawing Sheets

FULL ALPHANUMERIC CHARACTER SET ENTRY FROM A VERY LIMITED NUMBER OF KEY BUTTONS

BACKGROUND OF THE INVENTION

1. Field of the Invention

The invention relates generally to computer equipment and more particularly to devices and methods for entering full alphanumeric character sets with a keypad having only a small number of buttons.

2. Description of the Prior Art

When both the space and cost of a full alphanumeric keyboard can be accommodated in a computer system or instrument, each key can be dedicated to a particular character. Standard personal computer keyboards for English therefore feature individual keys for numbers 0–9, letters A–Z and a–z, punctuation and arithmetic operators.

Keyboards that come with a fixed set of characters each printed on a key button typically require a large number of keys to accommodate a rich character set for any particular language and alphabet. Such keyboards are, by definition, inflexible. Other languages and alphabets require hardware changes, and/or data entry method changes to accommodate large character sets.

SUMMARY OF THE PRESENT INVENTION

It is therefore an object of the present invention to provide a flexible graphical user interface that is both flexible and able to accommodate very large, very rich character sets while only requiring a very modest keypad.

It is another object of the present invention to provide a keyboard device and method for accommodating character set changes for rich character sets with software changes.

Briefly, a graphical machine-user interface embodiment of the present invention includes a processor connected to a display screen to generate a screen display of individual items in groups together with the selector indication. The processor and a display screen are used to advantage to provide a rich keyboard function from a very limited set of pushbuttons. For example, five pushbuttons indicating "up", "right", "down", "left", and "middle" are recursively used to reduce a large two-dimensional matrix of item choices presented on the display to some subset, e.g., a top, right, bottom, left, or middle subset. If the reduction results in a choice of one, then that item is selected and output automatically. If the reduction results in a subset with more than one item, then a recursive process is used in which the selection process is repeated until the selected subset is reduced to a single item.

An advantage of the present invention is that a graphical user interface is provided that provides a rich character set and selection from a limited keypad.

Another advantage of the present invention is that a keyboard device and method is provided that can accommodate variations in character set usage without requiring man-machine interface hardware changes.

These and other objects and advantages of the present invention will no doubt become obvious to those of ordinary skill in the art after having read the following detailed description of the preferred embodiment that is illustrated in the drawing figures.

IN THE DRAWINGS

DETAILED DESCRIPTION OF THE PREFERRED EMBODIMENT

Figure 1:
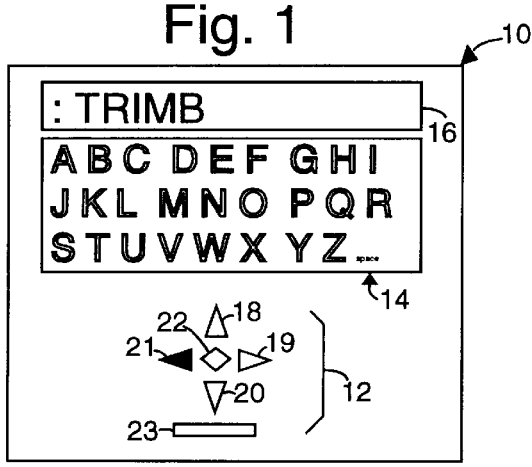
FIGS. 1–12 illustrate a graphical user interface embodiment of the present invention.

FIGS. 1–12 illustrate a graphical user interface (GUI) embodiment of the present invention, referred to herein by the general reference numeral 10. The GUI 10 comprises a keypad 12, an alphanumeric display 14, and a command entry line 16. FIGS. 1–4 represent the display conditions and buttons pressed in order to select the letter "L" from the alphanumeric display 14 and have the selected letter inserted onto the end of a word being spelled out in command entry line 16. This changes "TRIMB" to "TRIMBL". FIGS. 5–8 represent the display conditions and buttons pressed in order to select the letter "E" from the alphanumeric display 14 and have the selected letter inserted onto the end of the word held in command entry line 16. This changes "TRIMBL" to "TRIMBLE". FIGS. 9–12 represent the display conditions and buttons pressed in an alternative sequence to select the letter "E" from the alphanumeric display 14 and have the selected letter inserted in command entry line 16. This alternative sequence also changes "TRIMBL" to "TRIMBLE".

In one embodiment, the keypad 12 may comprise an arrangement of user pushbuttons 18–23. "Up" or "top" is selected by up-arrow pushbutton 18. "Right" is selected by right-arrow pushbutton 19. "Down" or "bottom" is selected by down-arrow pushbutton 20. "Left" is selected by left-arrow pushbutton 21. "Middle" or "center", is selected by diamond-shaped pushbutton 22. A utility function, such as "escape" is provided by a pushbutton bar 23. The alphanumeric display 14 and command entry line 16 may be implemented with a single liquid crystal display (LCD) familiar to laptop computer users, or with a cathode ray tube (CRT) monitor familiar to desktop personal computer (PC) users. What is presented on the alphanumeric display 14 command entry line 16 is preferably under computer control, and responsive to user pushbuttons 18–23.

FIG. 1 represents the starting conditions for the entry of a letter "L" that is to be added to a word already in progress, e.g., "TRIMB". The alphabet shown in the alphanumeric display 14 has all its letters A–Z and "space" highlighted. The object is to reduce this 3×9 matrix to a single 1×1 array. Since the letter "L" is in the leftmost 3×3 group, the left-arrow pushbutton 21 is pressed. This is indicated in the drawing by the pushbutton being blackened.

Figure 2:
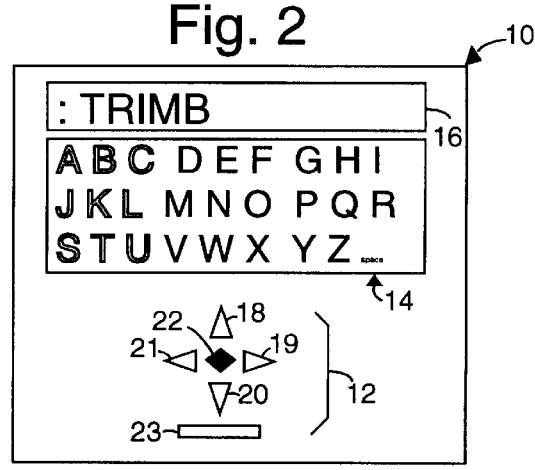

FIG. 2 shows the result of pressing the left-arrow pushbutton 21. The alphabet shown in the alphanumeric display 14 has only the leftmost 3×3 block of letters highlighted, e.g., A–C, J–L, and S–U. Since the letter "L" is in the middle row of the highlighted 3×3 group, the diamond pushbutton 22 is pressed. This is indicated in the drawing by the pushbutton being blackened. The user could have decided that the letter "L" belonged to the rightmost column instead. So it is preferable that the user be allowed to do this. The pressing of the right-arrow pushbutton 19 will result in the rightmost column being highlighted, e.g., letters "C", "L", and "U". The use of such alternative paths will be described more fully in connection with FIGS. 8–12.

Figure 3:
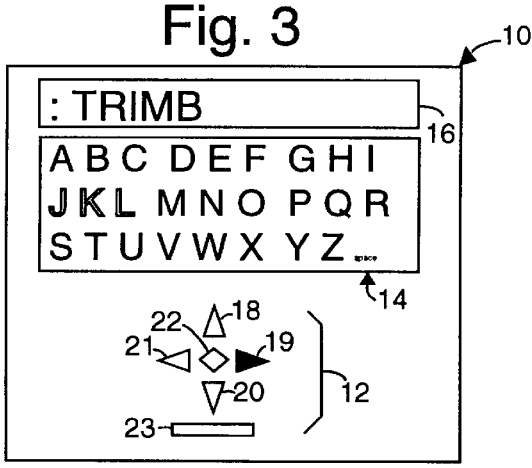

FIG. 3 shows the result of the first alternative, e.g., the user pressed the diamond pushbutton 22. The alphabet shown in the alphanumeric display 14 has only the middle 1×3 row of letters highlighted, e.g., J–K. Since the letter "L" is in the rightmost position of the highlighted 1×3 group, the right-arrow pushbutton 19 is pressed. This is indicated in the drawing by the pushbutton being blackened.

Figure 4:
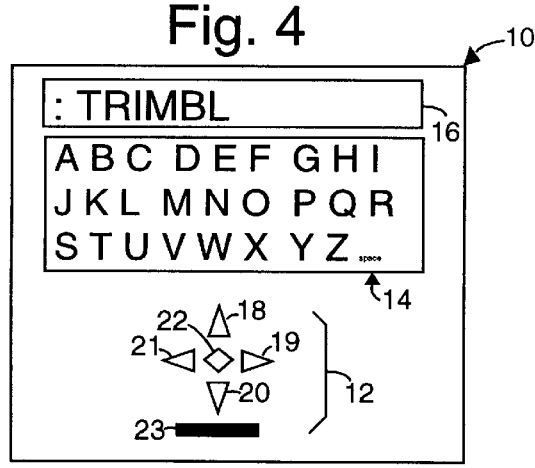

FIG. 4 shows that when the selection has been reduced to a 1×1 block, the single member of that block is automatically entered. In this case "L" is entered on the command line 16. The letters A–Z and "space" in the alphanumeric display 14 all lose their highlighting, or alternatively revert to the starting condition shown in FIG. 1. The pressing of pushbutton bar 23 can be used as a softkey to indicate "undo" or to indicate "escape", or some other utility function. This is indicated in the drawing by the pushbutton 23 being blackened.

Figure 5:
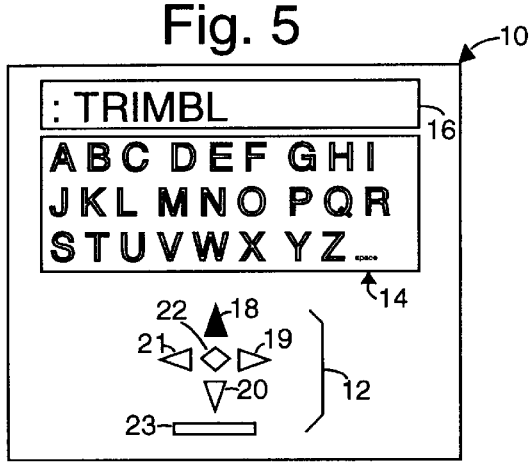

FIG. 5 represents the starting conditions for the entry of a letter "E" that is to be added to a word already in progress, e.g., "TRIMBL". The alphabet shown in the alphanumeric display 14 has all its letters A–Z and "space" highlighted. Again the object is to reduce this 3×9 matrix to a single 1×1 array. Since the letter "E" is in the topmost 1×9 line, the up-arrow pushbutton 18 is pressed. This is indicated in the drawing by the pushbutton being blackened. The user could have decided that the letter "E" belonged to the middle 3×3 block instead, e.g., letters D–F, M–O, and V–X, and pressed the diamond pushbutton 22. So it is preferable that the user be allowed to do this. This tangent is described in connection with FIGS. 9–12. The pressing next of the up-arrow pushbutton 18 will result in the top 1×3 row being highlighted, e.g., letters D–F.

Figure 6:
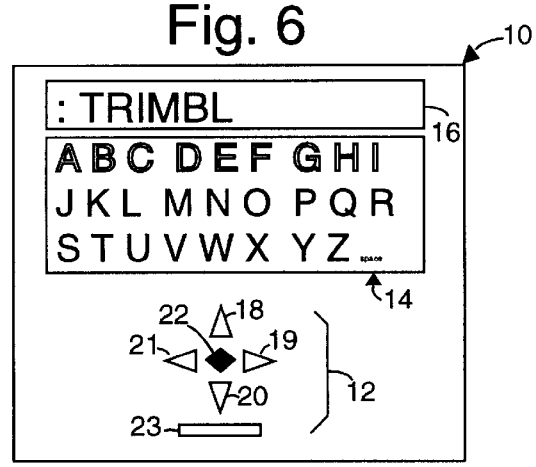

FIG. 6 shows the result of pressing the up-arrow pushbutton 18 in FIG. 5. The alphabet shown in the alphanumeric display 14 has only the top 1×9 block of letters highlighted, e.g., A–I. Since the letter "E" is in the middle 1×3 group of the highlighted 1×9 group, the diamond pushbutton 22 is pressed. This is indicated in FIG. 6 by the pushbutton 22 being blackened.

Alternative functions may be provided, for example, by pressing up-arrow pushbutton 18 or down-arrow pushbutton 20 when presented with the screen display illustrated in FIG. 6. Such actions could move the cursor into the command line 16, or select another character set, number set, or even a menu for display in display 14.

Figure 7:
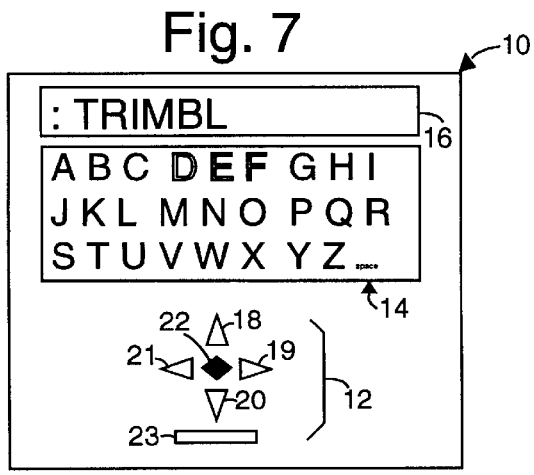

FIG. 7 shows the result of the first alternative, e.g., the user pressed the diamond pushbutton 22 in FIG. 6. The alphabet shown in the alphanumeric display 14 has only the middle 1×3 group of letters highlighted, e.g., D–F. Since the letter "E" is in the center position of the highlighted 1×3 group, the diamond pushbutton 22 is pressed. This is indicated in the drawing by the pushbutton being blackened.

Figure 8:
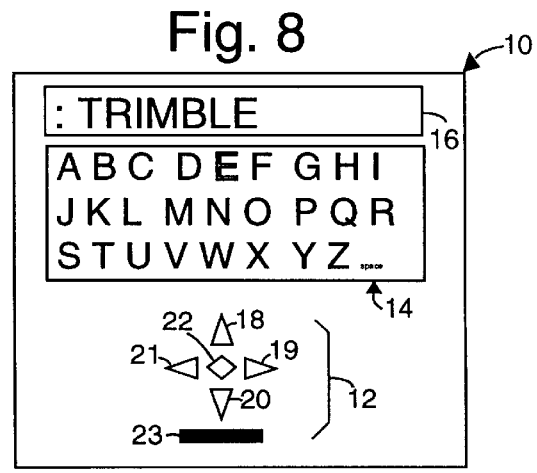

FIG. 8 shows that when the selection has been reduced to a 1×1 block, the single member of that block, i.e., "E", is automatically entered on the command line 16. After initially showing only "E" highlighted, for example, all the letters A–Z and "space" in the alphanumeric display 14 lose their highlighting, or alternatively revert to the starting condition shown in FIG. 1 or 5. Again, the pressing of pushbutton bar 23 can be used as a softkey to indicate "undo" or to indicate "escape", or some other utility function, at any point in the sequence. This is indicated only in FIG. 8 by the pushbutton 23 being blackened.

Figure 9:
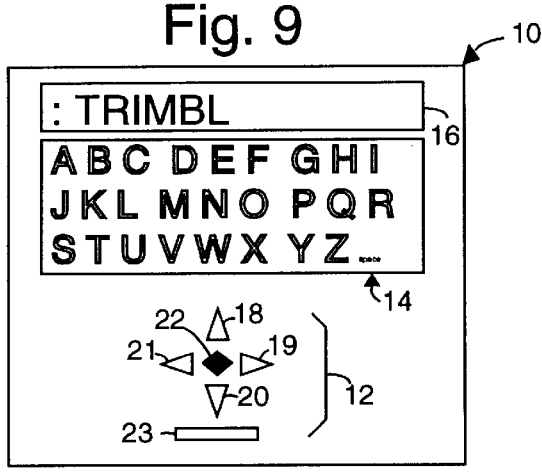

The alternative user sequence mentioned in connection with FIG. 5 is now illustrated by the following discussion. FIG. 9 represents the starting conditions for the entry of a letter "E" that is to be added to a word already in progress, e.g., "TRIMBL". The alphabet shown in the alphanumeric display 14 has all its letters A–Z and "space" highlighted. If the user decided that the letter "E" belonged to the middle 3×3 block, e.g., letters D–F, M–O, and V–X, the diamond pushbutton 22 would be pressed.

Figure 10:
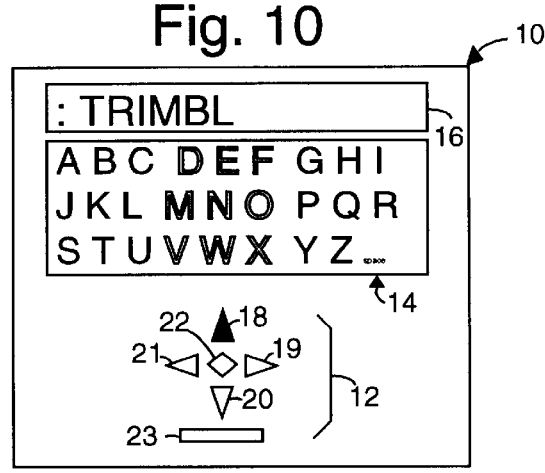

FIG. 10 shows the result of pressing the diamond pushbutton 22 in FIG. 9. The alphabet shown in the alphanumeric display 14 has only the middle 3×3 block of letters highlighted, e.g., D–F, M–O, and V–X. Since the letter "E" is in the top 1×3 row of the highlighted 3×3 group, the up-arrow pushbutton 18 is pressed.

Figure 11:
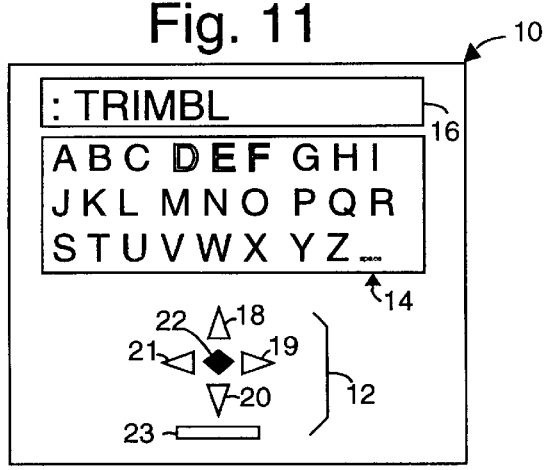

FIG. 11 shows the result of the user having pressed the up-arrow pushbutton 18 in FIG. 10. The alphabet shown in the alphanumeric display 14 has only the upper 1×3 group of letters highlighted, e.g., D–F. Since the letter "E" is in the center position of the highlighted 1×3 group, the diamond pushbutton 22 is pressed.

Figure 12:
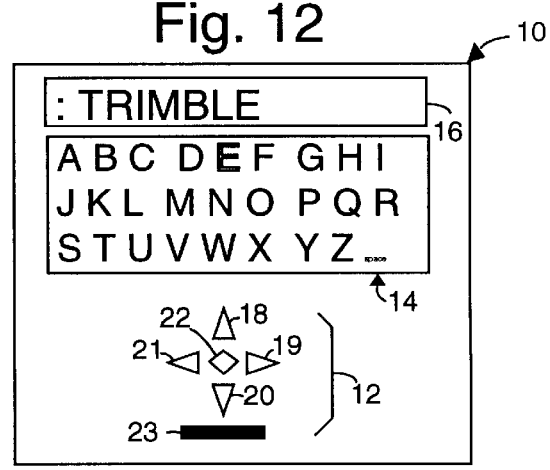

FIG. 12 is exactly like FIG. 8, and shows that when the selection has been reduced to a 1×1 block, the single member of that block, i.e., "E", is automatically entered on the command line 16. After initially showing only "E" highlighted, for example, all the letters A–Z and "space" in the alphanumeric display 14 lose their highlighting, or alternatively revert to the starting condition shown in FIG. 1 or 5.

Figure 13:
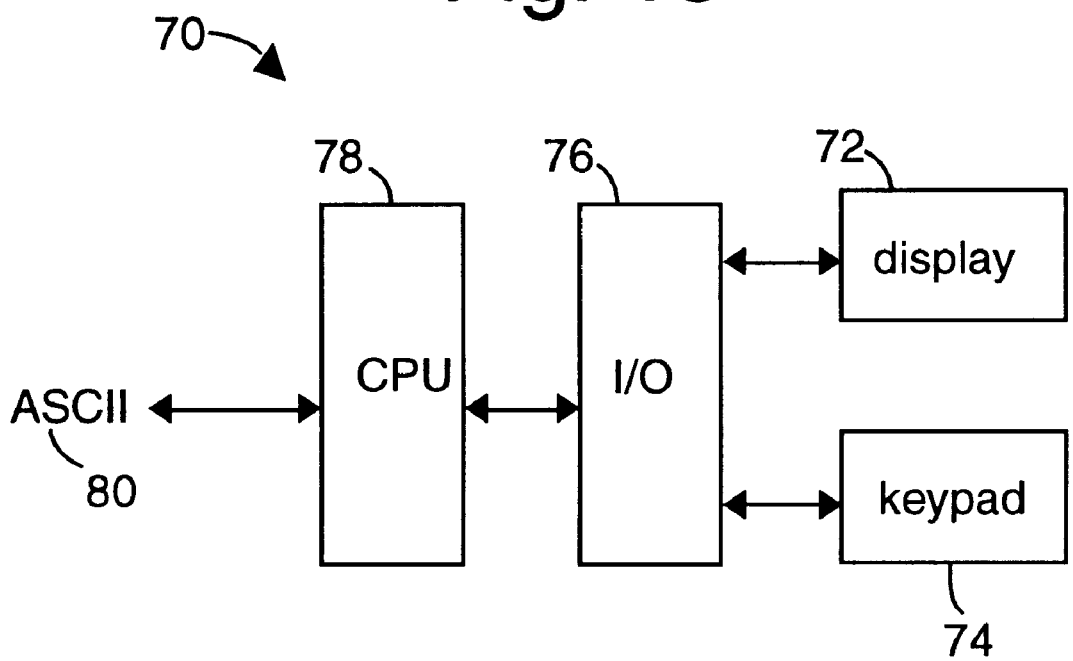
FIG. 13 is a function block diagram of a display and keypad pair, similar to those represented FIGS. 1–12, connected through an input/output peripheral interface to a microcomputer.

FIG. 13 represents a "quick-key" embodiment of the present invention, referred to herein by the general reference numeral 70. The quick-key 70 comprises a display 72, similar to displays 14 and 16 of FIGS. 1–12, and a keypad 74, similar to keypads 12. The display 72 and keypad 74 are connected through an input/output (I/O) peripheral interface 76 to a microcomputer 78. The quick-key 70 is able to produce a variety of standard serial data "ASCII" output character streams for use by a personal computer or instrument. In particular, such a system of user data entry would be useful in a global positioning system (GPS) navigation receivers where the graphics display is capable of displaying a relatively large number of characters, but the number and variety of key buttons possible is very limited.

Figure 14:
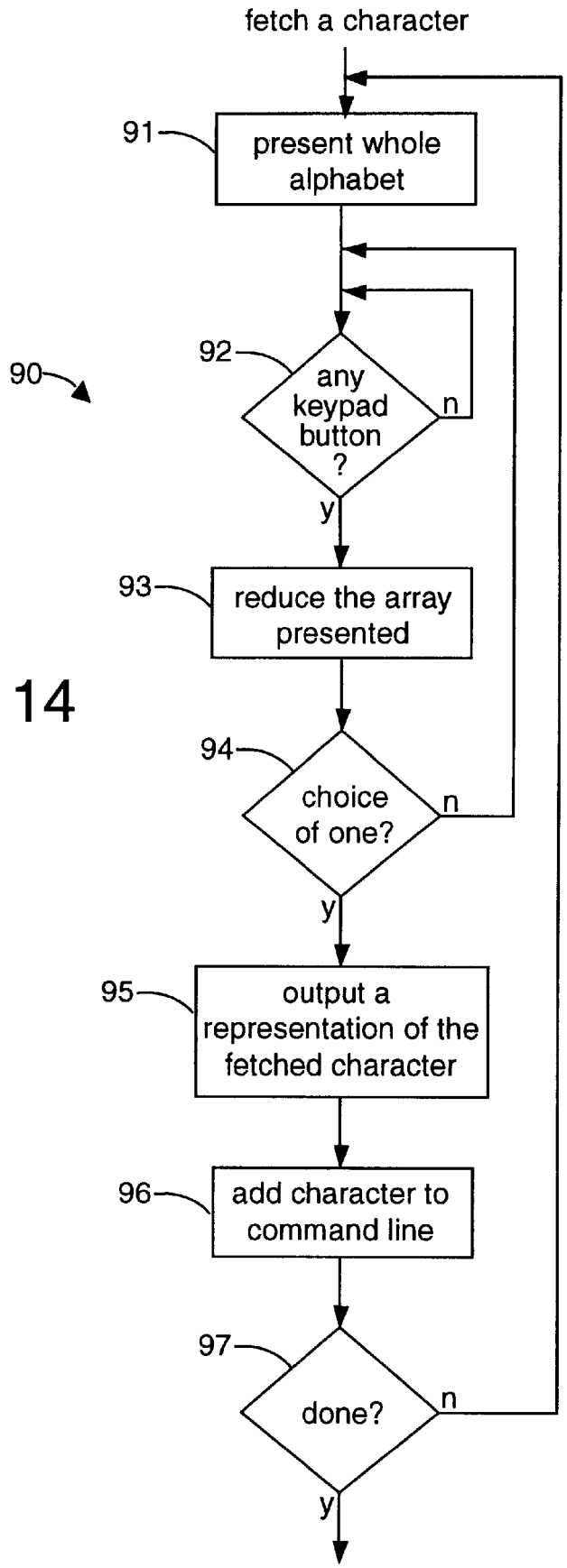
FIG. 14 is a flowchart of a computer-implemented method embodiment of the present invention.

FIG. 14 is a flowchart that illustrates a computer-implemented method embodiment of the present invention, referred to herein by the general reference numeral 90. Such flowchart is simplified and error handling is not shown which would allow for invalid keypresses, delete and escape functions. The method 90 may be executed as a control program firmware in the microcomputer 78 of FIG. 13. The method 90 comprises a step 91 that presents the whole alphabet on a display to a user and highlights the alphabet letters, as in FIG. 1. A step 92 looks for any button in the keypad 12 or 74 being depressed. If none, the program wait loops. Otherwise, a step 93 reduces the matrix presented to a smaller array, e.g., as shown in FIGS. 2 and 3. A step 94 looks to see if the matrix reduction resulted in a 1×1 array, e.g., a choice of one character. If so, a step 95 outputs a serial data representation 80 on an interface. Otherwise, the program loops back further matrix reductions by the user. A step 96 adds the selected character to the command line, as in FIG. 4. A step 97 decides if the entry is complete, and if not loops back to step 91 to present the full alphabet again.

One consequence of the embodiments described is that the same characters will be consistently be accessed by the same sequence of keystrokes. Some users may come to remember such keystroke sequences the way typists become experienced.

It is also important to arrange the selectable characters on the display screen in a way that makes sense given the arrangement of the keys that can be used, especially for first-time and infrequent users. For example, color can be used in the display and in the keys. So instead of simple black and white highlighting, red, green, and blue colored keys could be used to select between characters or groups that are correspondingly colored red, green, and blue. Of course more colors would allow more choices at each level, but too many colors may be hard to discern for some users. Such use of colors may prove to be more comfortable and easier to use than the spatial scheme described for the embodiments.

Although the present invention has been described in terms of the presently preferred embodiment, it is to be understood that the disclosure is not to be interpreted as limiting. For example, the keys could be used to select something other than characters from a displayed alphabet, such as line items from a menu or list. Various alterations and modifications will no doubt become apparent to those skilled in the art after having read the above disclosure. For example, two-dimensional displays and keypad arrangements have been described herein, but the use of three-dimensional interfaces would also represent an embodiment of the present invention. Three-dimensional volumes of 3×3×3, for example, would be reduced one 3×3 plane at a time by pushbutton entries. Accordingly, it is intended that the appended claims be interpreted as covering all alterations and modifications as fall within the true spirit and scope of the invention.

What is claimed is:

1. A machine-user interface, comprising:

a matrix-reduction selection keypad with corresponding user pushbuttons representing "up", "right", "down", "left", and "middle";

an alphanumeric display proximate to the matrix-reduction selection keypad and providing for the display of a first two-dimensional matrix of individual characters;

a selection indication connected to the alphanumeric display for highlighting a second two-dimensional matrix of individual characters that is a subset of said first two-dimensional matrix of individual characters; and a processor connected to the alphanumeric display and the matrix-reduction selection keypad, and programmed to generate a screen display of said first and second two-dimensional matrices of individual characters;

wherein, the matrix-reduction selection keypad is recursively used to reduce said first two-dimensional matrices of individual characters to said second two-dimensional matrices of individual characters, and if such is not a 1×1 matrix with a single member, then further to an nth subset of two-dimensional matrices of individual characters, and said user pushbuttons representing "up", "right", "down", "left", and "middle" are used to select a next succeeding subset from its parent subset.

2. The machine-user interface of claim 1, further comprising:

an "undo" button that permits a recursive reduction to a smaller subset of two-dimensional matrix of individual characters to be returned to a parent two-dimensional matrix of individual characters.

3. The machine-user interface of claim 1, wherein:

said first two-dimensional matrix of individual characters comprises a 3×9 array including alphabet letters A–Z.

4. The machine-user interface of claim 1, wherein:

said second two-dimensional matrix of individual characters comprises a 3×3 array including as many as nine alphabet letters A–Z.

5. The machine-user interface of claim 1, wherein:

said nth two-dimensional matrix of individual characters comprises a third two-dimensional matrix of individual characters of dimension 1×3 or 3×1 and includes a subset of as many as three alphabet letters A–Z.

6. The machine-user interface of claim 1, wherein:

said nth two-dimensional matrix of individual characters comprises a fourth two-dimensional matrix of individual characters of dimension 1×1 and includes a subset of only one alphabet letter A–Z.

7. A machine-user interface, comprising:

a matrix-reduction selection keypad with corresponding user pushbuttons;

an alphanumeric display proximate to the matrix-reduction selection keypad and providing for the display of a first three-dimensional matrix of individual characters;

a selection indication connected to the alphanumeric display for highlighting a second three-dimensional matrix of individual characters that is a subset of said first three-dimensional matrix of individual characters; and a processor connected to the alphanumeric display and the matrix-reduction selection keypad, and programmed to generate a screen display of said first and second three-dimensional matrices of individual characters;

wherein, the matrix-reduction selection keypad is recursively used to reduce said first three-dimensional matrices of individual characters to said second three-dimensional matrices of individual characters, and if such is not a 1×1 matrix with a single member, then further to an nth subset of three-dimensional matrices of individual characters, and said user pushbuttons are used to select a next succeeding volume subset from its parent volume subset.

8. The machine-user interface of claim 7, further comprising:

an "undo" button that permits a recursive reduction to a smaller subset of three-dimensional matrix of individual characters to be returned to a parent three-dimensional matrix of individual characters.

9. The machine-user interface of claim 7, wherein:

said first three-dimensional matrix of individual characters comprises a 3×3×3 array including alphabet letters A–Z.

10. The machine-user interface of claim 7, wherein:

said second three-dimensional matrix of individual characters comprises a 3×3 two-dimensional plane array including as many as nine alphabet letters A–Z.

11. The machine-user interface of claim 7, wherein:

said nth three-dimensional matrix of individual characters comprises a third one-dimensional linear array of individual characters and includes a subset of as many as three alphabet letters A–Z.

12. The machine-user interface of claim 7, wherein:

said nth three-dimensional matrix of individual characters comprises a volume of dimension 1×1 and includes only one alphabet letter A–Z.

* * * * *